united States Patent Office  3,138,610
Patented June 23, 1964

3,138,610
SUBSTITUTED IMIDAZOLINES
Saul R. Buc, deceased, late of Easton, Pa., by Dolores M. Buc, administratrix, Easton, Pa., and Earl P. Williams, Pen Argyl, Pa., assignors to General Aniline & Film Corporation, New York, N.Y., a corporation of Delaware
No Drawing. Filed Mar. 10, 1961, Ser. No. 94,938
7 Claims. (Cl. 260—309.6)

This invention relates to the preparation of certain substituted imidazolines which are useful as antistatic agents for synthetic fibers and to a process for preparing them.

A primary object of this invention is to provide an improved process for the preparation of novel compounds having the general formula

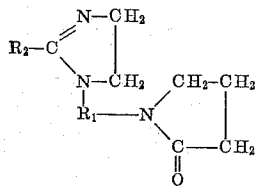

wherein $R_1$ is an alkylene radical having 1 to 6 carbon atoms and $R_2$ is a radical derived from an acid of the group consisting of abietic acid, naphthenic acid, natural and synthetic aliphatic acids, alkylated aromatic acids, phenoxyalkanoic acids, and mixtures of these. More particularly, $R_2$ represents a radical having from 1 to about 22 carbon atoms selected from the group consisting of alkyl, alkenyl, alkadienyl, alkynyl, alkylated phenyl, abietyl, naphthenyl, phenoxyalkyl, and halogenated phenoxyalkyl. It will be understood that the terms "abietyl" and "naphthenyl," as employed herein in the specification and claims, are intended to refer to radicals $R_2$ derived from abietic and naphthenic acids ($R_2CO_2H$), respectively.

Another object of this invention is the provision of a process for preparing such compounds by reacting a suitable aminoethylaminoalkylpyrrolidone with an appropriate carboxylic acid at elevated temperatures, with the elimination of two moles of water.

A further object is to provide an improved process for the preparation of novel intermediates having the general formula

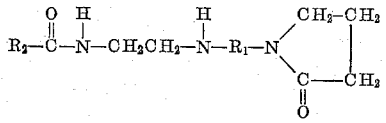

wherein $R_1$ and $R_2$ have the same significance as above.

Still another object of the invention is the provision of an improved process for preparing these novel intermediates by reacting an aminoethylaminoalkylpyrrolidone with a carboxylic acid at elevated temperatures with the elimination of only one mole of water.

Yet a further object of the invention is preparation of novel surfactants to be used wherever an agent having wetting, emulsifying, dispersing, foaming, frothing, etc. properties is desired.

Another object of this invention is the provision of a method for rendering antistatic synthetic textile fibers by applying thereto a substituted imidazoline of the general formula shown above.

A further object of this invention is the preparation of highly effective antistatic agents for synthetic fibers by condensing an aminoethylaminoalkylpyrrolidone with a higher fatty acid or mixture of such acids in a two-stage heating process whereby one mole of water is eliminated from each stage.

Still another object is the preparation of novel compounds from an aminoethylaminoalkylpyrrolidone and the mixture of acids derived from tall oil or hydrogenated tall oil or from natural plant and animal oils.

Another object is the prepaartion of the novel compounds by condensing an aminoethylaminoalkylpyrrolidone with an acid mixture produced by oxidizing a petroleum fraction or by oxidizing a mixture of aldehydes and/or alcohols produced by the oxo process.

Other objects of this invention will be apparent from the following detailed description.

The objects of this invention may be attained by effecting a condensation reaction between a suitable aminoethylaminoalkylpyrrolidone and an appropriate acid, according to the following reaction scheme, wherein $R_1$ and $R_2$ have the same significance as above:

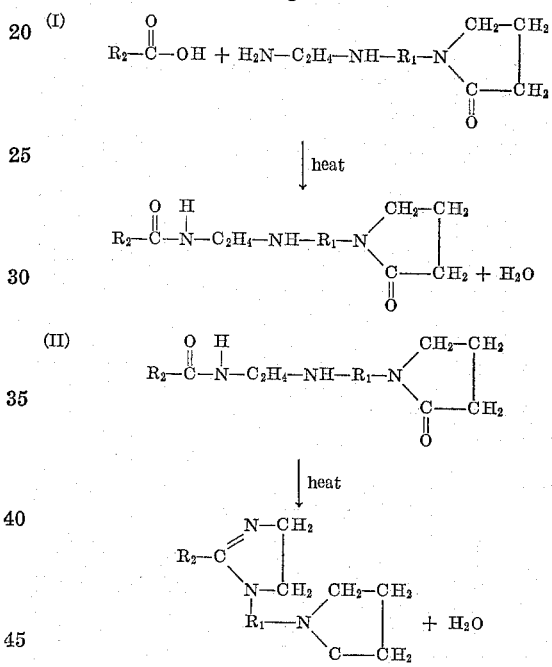

Preferably the process is carried out in two stages as indicated, the reaction temperature in Stage II being 20–100° C. higher than in Stage I. Using this mode of operation, conversions to imidazoline compound of the order of 80–90% are achieved. The intermediate product produced in Stage I, or "amide-amine" as it shall be called hereinafter, may be used directly in Stage II without extraneous purification steps, although it can also, if desired, be subjected to purification before Stage II. In another modification of the process, the overall reaction may be accomplished in one vigorous heating stage. If the latter is done, however, the conversion to imidazoline product is found to be low and the product itself is less pure. Moreover, even with such vigorous heating, the heating time required is of the same order as that required for the two combined stages.

In general, it is preferred to carry out the reaction process under reduced pressure, particularly if the initial acid reactant is of an oily nature and easily charrable. When the acid reactant is a very low molecular weight acid such as acetic, propionic or butyric acid, the use of atmospheric pressure gives equally as good conversions as does a partial vacuum. When the acid is a higher fatty acid or a natural oil-derived mixture, however, there is so much charring at atmospheric pressure that results are noticeably poorer.

The reactants may be chosen from numerous compounds. The aminoethylaminoalkylpyrrolidone may be any such compound in which the alkyl radical has from 1 to 6 carbon atoms, including aminoethylaminomethylpyrrolidone, aminoethylaminoethylpyrrolidone, aminoethylaminopropylpyrrolidone, etc.

The carboxylic acid reactant may be a single compound or a mixture of acids. Among those suitable are the saturated aliphatic acids, such as acetic, propionic, butyric, pentanoic, caproic, capryllic, pelargonic, capric, lauric, myristic, palmitic, stearic, etc.; the olefinic aliphatic acids such as butenoic, pentenoic, hexenoic, octenoic, oleic, linoleic, hexadienoic, octadienoic, octatrienoic, etc., the acetylenic aliphatic acids such as butynoic, pentynoic, hexynoic, heptynoic, dodecynoic, etc., acids derived from tall oil or hydrogenated tall oil, naphthenic acids and abietic acid alone or in admixture with other rosin acids. Also suitable are the phenoxyalkanoic acids such as phenoxyacetic, phenoxypropionic, phenoxybutyric, etc.; their halogenated derivatives including mono-, di- and trichloro-, -bromo-, -fluoro- and -iodo-phenoxyacetic acids and their higher alkanoic acid homologs, as well as the various mixed halogenated phenoxyalkanoic acids, including fluorochloro, fluorobromo, fluoroiodo, bromochloro, bromoiodo and chloroiodo phenoxyalkanoic acids in which one or more of each halogen substituent may be present.

Other acid reactants found to be operable are the alkylbenzoic acids including both lower alkylbenzoic acids such as toluic acid, dimethylbenzoic, propylbenzoic, butylbenzoic, etc. and the longer chain alkylbenzoic acids such as, for example, octyl-, nonyl-, decyl-, dodecyl-, tetradecyl-benzoic acids, as well as the polyalkylbenzoic acids.

Various acid mixtures are also particularly suitable reactants. Among these may be mentioned the mixtures obtained by oxidizing petroleum fractions and the mixtures obtained by the oxidation of aldehydes or alcohols produced by the oxo process. Furthermore, the acid mixtures derived from various natural plant and animal oils produce very desirable products; among the oils whose acid mixtures have been used are olive oil, butter, tallow, and palm, castor, peanut, coconut, soybean, ucuhuba, linseed, cod liver, herring, menhaden, halibut, neat's-foot, sperm, corn, babassu, kapok, hempseed, mustard, rapeseed, safflower, and sesame oils. Acids derived from numerous other oils are also suitable, as will be readily apparent to one skilled in the art.

The intermediate "amide-amines" produced according to the process of this invention have usefulness as intermediates for various other chemical compounds than the substituted imidazolines which are the ultimate product of this invention. Moreover, those compounds in which $R_2$ is a long chain aliphatic group or a radical derived from a long chain alkylbenzoic acid have of themselves valuable surfactant properties.

The imidazoline products of this invention are cationic in nature and have numerous widely varied uses. Their most outstanding property is their pronounced surfactant and interfactant activity. In addition, some of the products in which $R_2$ is the radical of a short chain acid have shown outstanding results in the agricultural chemical field, i.e., as insecticides, herbicides, fungicides, plant growth regulators, seed-treating agents, etc.

Among the specific uses for which the substituted imidazoline products have been found to be suitable are as wetting, frothing and washing agents in treating and refining textiles, as emulsifiers for water-insoluble liquids and solids, as emulsifiers in carbonizing and dyeing operations, as agents for the pasting of dyestuffs, as assistants in filling, sizing, impregnating and bleaching treatments, as cleansing agents in hard water, as assistants in tanning and mordanting processes, as assistants in the dyeing of cellulose acetate materials with insoluble dyestuffs, as foaming agents in fire extinguishers, as softening and absorption-improving agents for fibrous bodies and as a softening aid in baths for hides and skins.

Further uses for the imidazoline products of this invention are as emulsifiers for insecticides and other argricultural sprays, including DDT, 2–4–D, Toxaphene, Chlordane, etc. as well as additives for various petroleum products including fuel oil, hydraulic fluids, lubricating oils, cutting oils, greases and also as additives to water or brine used for oil recovery from oil-bearing strata by flooding techniques.

The imidazoline products of this invention may be added to metal cleaning compounds, dry cleaning compounds, rubber latices, they may be used as foam inhibitors for synthetic rubber latex emulsions, as froth flotation agents, additives for road building materials, air entraining agents for cement or concrete, asphalt compositions additives, plasticizers and modifiers for vinyl and other types of plastics; they may be incorporated into adhesives, paints or linoleum compositions, added to bonding agents for insulating and building materials, used as refining aids in wood digesters for pulp preparation and as additives to pulp slurries in beating operations where they will prevent foaming and also aid in the beating operation.

Still further, the imidazoline products of this invention are effective emulsifiers in emulsion polymerization as mercerizing assistants for textiles, as wetting agents, rewetting agents, dispersing agents penetration assistants for detergents, softening agents, cutting oils, lime soap disperants, dishwashing compounds, antistatic agents, disinfectants, biocides, etc.

They also have been found to be effective as antifogging agents for use on glass and other transparent surfaces. They may be used in the rayon industry as dope additives and as aids for clarifying viscose. Addition of these compounds to hydraulic fluids improves the properties of the fluids. The compounds may be used to break petroleum emulsions both in oil recovery processes and in refining processes.

Other uses for the imidazoline products of this invention are as corrosion and rust inhibitors in acid pickling baths, acid cleaning compositions, electroplating baths and in protecting metals, especially ferrous metals, with a film or coating of inhibitor. Some of the compounds are effective solvents, especially in cleaning paint brushes, etc. They may be added also to skin creams, lotions, salves, permanent wave solutions, shampoos, tooth paste, etc. They are useful as laxatives or additives therefor and as absorption-assistants in various internal medicines. They may also be added to foods as foaming, emulsifying and softening agents.

The imidazoline products produced by condensing aminoethylaminoethylpyrrolidone with aliphatic acids having 8 or more carbons are especially effective as antistatic agents for synthetic fibers, including acrylic fibers such as Orlon and Acrilan polyester fibers such as Dacron and nylon polyamide fiber, though the whole class of compounds herein disclosed has an antistatic effect on textiles and plastics.

The process of rendering synthetic textiles antistatic may be carried out in numerous ways, all of which are conventional in the art. The specific ones given here are to be construed as illustrative rather than limiting. An effective antistatic treatment consists in adding the new antistatic agent to either the textile fibers or the woven textile fabric in a dyebath, whereby dyeing and rendering the textile materials antistatic are accomplished concomitantly. Another effective method is to render finished textile products antistatic by incorporating the substituted imidazoline product into the wash water each time the textile is washed. The antistatic agent to be used in this way may be added separately to the wash water or may be previously incorporated in a suitable soap, detergent or bleach composition or in a composite soap-bleach or detergent-bleach product.

Having generally described the invention, the following examples are given by way of specific illustration:

Example 1

141.2 grams (0.5 mol) oleic acid and 85.5 grams (0.5 mol) aminoethylaminoethylpyrrolidone were placed in a 250 ml. 3-neck flask equipped with a stirrer, a thermometer and a downward condenser-connected to a receiver, the latter being equipped for vacuum take-off.

Heat and partial vacuum were applied to the contents of the flask, conditions therein being maintained at 112°–140° C./30 mm. (mercury pressure) for 7 hours. During this time 10.0 grams of distillate, largely water, were collected.

The product in the flask was identified as oleoylamidoethylaminoethylpyrrolidone.

100.0 grams of this "amide-amine" thus formed was heated at 175–227° C./30 mm. for 3 hours, during which time 4.4 grams of distillate (again mainly water) were collected.

The product was an amber liquid, soluble in 65/75 Saybolt viscosity mineral oil and readily dispersible in water. Ultra-violet analysis for imidazoline content showed the conversion, based on the feed, to be 88.7%.

When 0.5 mol of aminoethylaminopropylpyrrolidone, aminoethylaminobutylpyrrolidone or aminoethylaminohexylpyrrolidone was substituted for aminoethylaminoethylpyrrolidone in the above example, similar results were obtained.

Example 2

Following the method of Example 1, 115.3 grams (0.8 mol) of isooctanoic acid (a $C_8$ fatty acid mixture marketed by Gulf Chemical Co.) and 136.8 grams (0.8 mol) of aminoethylaminoethylpyrrolidone were heated at 110–142° C./30 mm. for 6 hours and 14.4 grams of distillate were removed. 100.0 grams of the amide-amine product were then heated at 170–214° C./30 mm. for 4 hours and 4.9 grams of distillate were collected.

This product was light amber in color, easily dispersible in water, but insoluble in 65/76 Saybolt mineral oil.

By ultra-violet analysis the conversion to imidazoline product was found to be 81.3%.

It was found that when a mixture of $C_9$ fatty acids made by oxidizing a $C_9$ "oxo" alcohol was substituted for isooctanoic acid, a similar product was obtained.

Similarly, an acid mixture made by directly oxidizing a $C_9$–$C_{11}$ petroleum fraction was substituted for isooctanoic acid with the production of a like product.

Example 3

Example 1 was repeated, substituting a 0.5 mol of lauric acid for oleic acid.

The product was a light amber liquid, soluble in water.

Example 4

Example 1 was repeated, substituting 0.5 mol of pelargonic acid for oleic acid.

Ultra-violet analysis of the product showed a conversion to imidazoline of 85.5%.

Examples 5–10

Using the method of Example 1, fatty acids from each of the following natural oils was substituted for oleic acid: olive oil, castor oil, soybean oil, cod liver oil, neat's-foot oil and hempseed oil. In each instance, the product showed strong surfactant properties in water.

Example 11

As in Example 1, 114.4 grams (0.4 mol) of Neo-Fat 42–06 (a synthetic mixture of oleic and linoleic acids) were reacted with 68.4 grams (0.4 mol) of aminoethylaminoethylpyrrolidone and the product recovered.

Example 12

Following the method of Example 1, 113.6 grams (0.4 mol) of stearic acid and 68.4 grams (0.4 mol) of aminoethylaminoethylpyrrolidone were reacted in two stages to form an imidazoline product.

Examples 13–18

Using the method of Example 1, each of the following acids were substituted for oleic acid: abietic acid, dodecylbenzoic acid, phenoxybutyric acid, 2,4-dichlorophenoxyacetic acid, tall oil fatty acids and a $C_8$ naphthenic acid fraction.

Each of the resulting products exhibited surfactant and wetting properties when admixed with water.

Example 19

Samples of synthetic textiles, i.e., Orlon, Acrilan, Dacron and nylon, of 20″ x 20″ size were dyed in dyebaths containing antistatic additives and the static charge of the finished product was determined as shown below (+ indicates high static charge, 0 indicates no detectable static charge):

| Additive | Orlon | Nylon | Dacron | Acrilan |
|---|---|---|---|---|
| None | + | + | + | + |
| Product of Example 1 | 0 | 0 | 0 | 0 |
| Product of Example 2 | 0 | 0 | 0 | 0 |
| Product of Example 3 | 0 | 0 | 0 | 0 |
| Product of Example 4 | 0 | 0 | 0 | 0 |
| Product of Example 11 | 0 | 0 | 0 | 0 |
| Product of Example 12 | 0 | 0 | 0 | 0 |

Example 20

Samples of Orlon, Acrilan, Dacron and nylon of 20″ x 20″ size which had received no antistatic treatment in the fiber spinning or textile finishing stages were washed in a common sodium laurylbenzene sulfonate detergent composition with and without added antistatic agent. As in Example 19, the products of Examples 1, 2, 3, 4, 11 and 12 were highly effective while the static charge of all textile samples washed without any additive was high.

Example 21

0.5 mol each of butyric acid and aminoethylaminoethylpyrrolidone were heated as in Example 1. The conversion to imidazoline product when analyzed by ultra-violet was found to be about 90%.

It is apparent that numerous substitutions and modifications may be made in the above described invention without departing from its spirit and scope.

What is claimed is:

1. The N(N-pyrrolidonyl alkyl) imidazoline compound having the formula

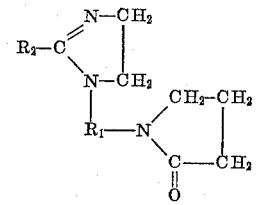

wherein $R_1$ is alkylene having from 1 to 6 carbon atoms and $R_2$ represents a radical having from 1 to about 22 carbon atoms selected from the group consisting of alkyl, alkenyl, alkadienyl, alkynyl, alkylated phenyl, abietyl, naphthenyl, phenoxyalkyl, and halogenated phenoxyalkyl.

2. The N(N-pyrrolidonyl alkyl) imidazoline compound having the formula

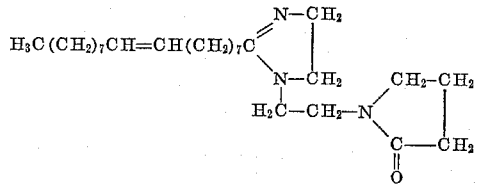

3. The N(N-pyrrolidonyl alkyl) imidazoline compound having the formula

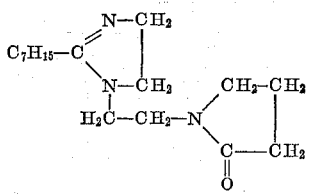

4. The N(N-pyrrolidonyl alkyl) imidazoline compound having the formula

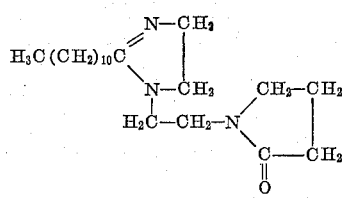

5. The N(N-pyrrolidonyl alkyl) imidazoline compound having the formula

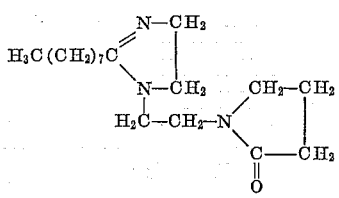

6. The N(N-pyrrolidonyl alkyl) imidazoline compound having the formula

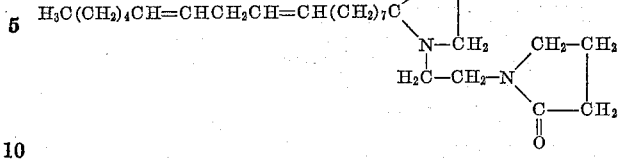

7. The N(N-pyrrolidonyl alkyl) imidazoline compound having the formula

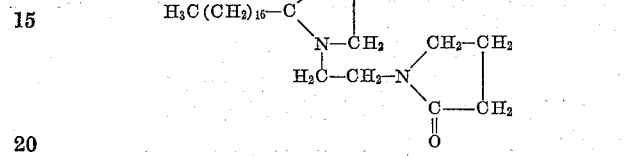

References Cited in the file of this patent
UNITED STATES PATENTS

| | | |
|---|---|---|
| 2,267,965 | Wilson | Dec. 30, 1941 |
| 2,868,727 | Hughes | Jan. 13, 1959 |
| 2,874,074 | Johnson | Feb. 17, 1959 |
| 2,877,179 | Hughes | Mar. 10, 1959 |
| 2,914,427 | Valko et al. | Nov. 24, 1959 |
| 2,945,863 | Buc et al. | July 19, 1960 |
| 2,987,522 | Shen | June 6, 1961 |